Figures 1, 2, 3:
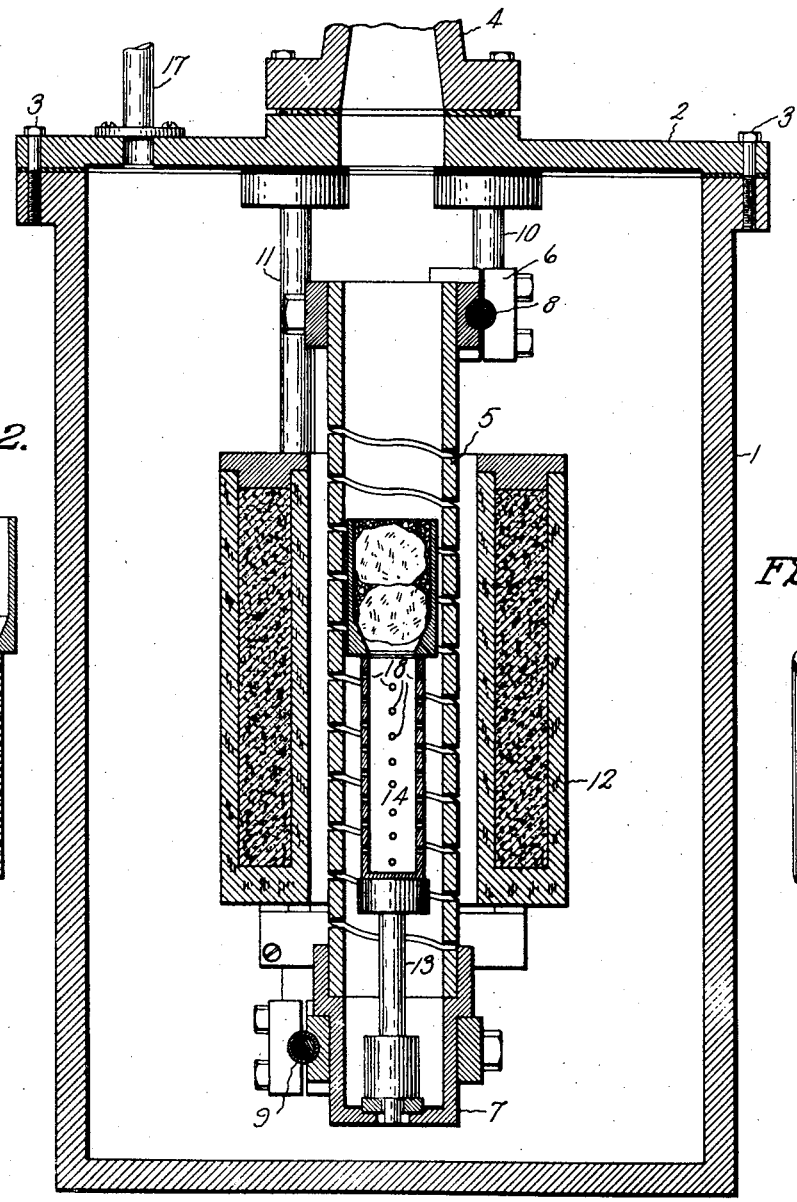

May 5, 1925.

L. B. MILLER

QUARTZ WORKING

Filed Jan. 25, 1924

1,537,036

Inventor,
Levi B. Miller,
by [signature]
His Attorney.

Patented May 5, 1925.

1,537,036

UNITED STATES PATENT OFFICE.

LEVI B. MILLER, OF LYNN, MASSACHUSETTS, ASSIGNOR TO GENERAL ELECTRIC COMPANY, A CORPORATION OF NEW YORK.

QUARTZ WORKING.

Application filed January 25, 1924. Serial No. 688,602.

*To all whom it may concern:*

Be it known that I, LEVI B. MILLER, a citizen of the United States, residing at Lynn, in the county of Essex, State of Massachusetts, have invented certain new and useful Improvements in Quartz Working, of which the following is a specification.

The present invention relates to the production of silica in a glassy or vitreous state which ordinarily is known as fused quartz, as distinguished from crystalline quartz. When crystalline quartz, even when pure and clear, is heated to fusion without special precaution a vitreous product is obtained which contains innumerable minute gas bubbles and therefore in substantial thickness is opaque.

In accordance with a process described in application, Serial No. 740,416, filed on Sept. 27, 1924, by Philip K. Devers, clear products of vitreous silica are prepared by fusing quartz in a vacuum and then subjecting the fused material to pressure, whereby cavities or bubbles are largely eliminated. It is the object of my present invention to still further improve the quality of clear, fused or vitreous silica, that is, to reduce the bubbles or cavities to a negligible residue.

In accordance with my present invention the slugs or blanks of vacuum-fused quartz are prepared by subjecting the quartz when in a softened condition to constrictive pressure which advances relative to the quartz mass and which is so applied as to displace the larger cavities to one end of a slug of quartz. This is done by causing the quartz in a plastic state to pass by gravity through a passage of decreasing cross-section. My invention also includes an apparatus comprising two receptacles joined by a tapered throat together with a vacuum furnace in which crystalline quartz may be converted to the glassy or vitreous condition.

The novel features of my invention will be pointed out with greater particularity in the appended claims. My invention will be explained in greater detail in the following specification taken in connection with the accompanying drawing which shows in Fig. 1 a vertical section of an apparatus adapted to carry out my invention; Fig. 2 shows the crucible and feeding hopper in vertical section; and Fig. 3 shows a finished slug.

Fig. 1 shows a vacuum furnace of the general type covered by Arsem Patents 785,535, of March 21, 1905, and 1,009,625 of November 21, 1911. The furnace comprises an enclosing tank 1, having a removable cover 2, which is connected to the tank by bolts 3, suitable gas-tight washers being interposed. A removable observation column 4 has been shown broken away. A helical resistor 5, preferably consisting of graphite, is provided, this resistor being connected to the electric terminals 6, 7. These terminals are provided respectively with water cooling ducts 8, 9, which are connected to the tubes 10, 11. The latter also serve as supports and current conveying leads, being connected to the cover 2 of the furnace, suitable insulation being provided as indicated. Surrounding the resistor 5 is a refractory screen 12, constituted by a carbon box containing finely divided carbon.

Within the resistor 5 and resting upon a supporting pedestal 13 is a crucible 14, which is shown separately in Fig. 2. Above this crucible is provided a receptacle 15, which communicates with the crucible 14 through a tapered throat 16. The crystalline quartz which is to be fused, is packed in the receptacle 15, as indicated. Preferably one or more large masses or chunks are placed in the center, the intervening spaces being filled with smaller particles. After thus charging the container 15, the furnace is evacuated through a tube 17, and the temperature is raised as fast as practicable to a degree at which the quartz softens sufficiently to slide into the lower crucible 14. The latter preferably is provided with holes indicated at 18, to permit of the escape of gases.

Before the quartz becomes plastic and at a temperature of about 550° C. it cracks into pieces due to the differing rates of expansion along different crystal axes. The cavities due to the breaking up of the crystal and also the cavities between the quartz particles constituting the charge tend to become trapped when the quartz softens at about 1650° C. As these cavities contain some gases even in a vacuum and as the quartz is very viscous they do not close up. By sliding through the tapered throat the cavities together with the low pressure gases filling them, become strangled out, that is, they are forced to the top of the mass and the quartz becomes correspondingly cleared. The greater cross-section of the upper charging chamber permits relatively large masses of raw quartz to be subjected to fusion, these being preferably placed in the center. Larger masses are less likely to enclose gas than a larger number of smaller pieces of quartz piled on top of each other. Finally a slug or ingot is formed in the lower chamber, as shown in Fig. 3. This slug has substantially the cross section of the narrowest part of the throat 16, and contains but few cavities. These cavities contain so little gas that they practically disappear when the slugs are reheated to plasticity under pressure.

The present process which requires only sufficiently high heating to render the quartz plastic enough to slowly flow together, should not be confused with any process whereby quartz is passed through a narrow slit, and caused to recoalesce in a chamber which has a materially larger diameter than the extruding slit.

What I claim as new and desire to secure by Letters Patent of the United States is:—

1. An apparatus for preparing fused or vitreous silica comprising the combination of a refractory container, one part of which has a greater diameter than the adjoining part and having a tapered throat connecting said parts, means for heating said container, and means for evacuating the space within said container.

2. An apparatus for preparing fused or vitreous silica comprising the combination of a vacuum tank, a charge-receiving hopper therein having a tapered throat, a mold in communication with said throat and having substantially the same diameter as said throat and means for heating a charge in said hopper.

3. An apparatus for preparing slugs or ingots of fused or vitreous silica, comprising the combination of a sealed tank, an elongated charge-receiving receptacle therein having a tapered throat, an elongated mold having substantially the diameter of said throat, means for supporting said receptacle and mold in vertical alignment, means for fusing a charge in said receptacle, and means for exhausting said tank.

4. An apparatus for preparing slugs or ingots of fused or vitreous silica comprising the combination of a sealed tank, an elongated charge-receiving receptacle therein having a tapered throat, an elongated mold having a plurality of vent holes, means for supporting said receptacle and mold in vertical alignment, means for fusing a charge in said receptacle, and means for exhausting said tank.

5. The method of preparing fused silica which consists in heating a charge of crystalline quartz to a temperature of plasticity, and passing said material while plastic through a passage of progressively decreasing diameter, and collecting said plastic material as an ingot proportioned to substantially preserve the general cross-section of the material in the narrowest part of said passage.

6. The method of preparing fused or vitreous silica which consists in heating crystalline silica to a temperature of plasticity in a vacuum, causing said material while plastic to pass through a passage of gradually decreasing diameter and causing said material to congeal after having passed through the narrowest part of said passage while preserving substantially the cross-section of said material.

7. The method of preparing fused or vitreous silica which consists in heating crystalline silica to a temperature of plasticity, subjecting said plastic silica to advancing constrictive pressure to eliminate cavities in said silica, and causing said silica to congeal while substantially preserving the cross-section thereof.

In witness whereof, I have hereunto set my hand this 21st day of January 1924.

LEVI B. MILLER.